US006820071B1

(12) United States Patent
Sullivan

(10) Patent No.: US 6,820,071 B1
(45) Date of Patent: Nov. 16, 2004

(54) KNOWLEDGE MANAGEMENT SYSTEM AND METHOD

(75) Inventor: Anthony D. Sullivan, Richardson, TX (US)

(73) Assignee: Electronic Data Systems Corporation, Plano, TX (US)

( * ) Notice: Subject to any disclaimer, the term of this patent is extended or adjusted under 35 U.S.C. 154(b) by 983 days.

(21) Appl. No.: 08/784,224

(22) Filed: Jan. 16, 1997

(51) Int. Cl.⁷ .............................. G06N 5/02; G06N 5/00
(52) U.S. Cl. ......................................... 706/50; 706/45
(58) Field of Search .............................. 395/54, 50, 60, 395/11

(56) References Cited

U.S. PATENT DOCUMENTS

| | | | | |
|---|---|---|---|---|
| 4,730,259 A | * | 3/1988 | Gallant ........................ | 395/60 |
| 4,751,635 A | * | 6/1988 | Kret ............................ | 395/701 |
| 5,101,425 A | * | 3/1992 | Darland et al. ............... | 379/34 |
| 5,263,126 A | * | 11/1993 | Chang .......................... | 395/51 |
| 5,410,344 A | * | 4/1995 | Graves et al. ................. | 348/1 |
| 5,499,340 A | * | 3/1996 | Barritz ................... | 395/184.01 |
| 5,548,506 A | * | 8/1996 | Srinivasan .................... | 705/8 |
| 5,623,413 A | * | 4/1997 | Matheson et al. ........... | 364/436 |
| 5,675,745 A | * | 10/1997 | Oku et al. ................... | 395/207 |
| 5,708,780 A | * | 1/1998 | Levergood et al. ......... | 709/229 |
| 5,931,912 A | * | 8/1999 | Wu et al. .................... | 709/224 |
| 6,351,745 B1 | * | 2/2002 | Itakura et al. ................ | 707/10 |

FOREIGN PATENT DOCUMENTS

EP   0 697 670 A   2/1996

OTHER PUBLICATIONS

Proceedings of the 1995 ACM CIKM International Conference on Information and Knowledge Management, Proceedings of CIKM '95: Conference on Information and Knowledge Management, Balitomore, MD, USA, Nov. 28–Dec. 2 by Chen J.R. et al., entitled "Learning subjective Relevance to Facilitate Information Access".

Information Processing & Management (Incorporating Information Technology), vol. 32, No. 3, May 1996 by Laine–Cruzel S. et al., entitled "Improving Information Retrieval by Combining User profile and Document Segmentation".

Proceedings of the First International Conference on the Practical Application of Intelligent Agents and Multi–Agent Technology, Proceedings of First International Conference on Practical Application of Intelligent Agents and Multi–Agent Tec, 1996, Blackpool, UK, Practical Application Company, UK, PAAM 96 by Abed S. et al., entitled "Agents at Work Pragmatics of Applying Agent Technology".

* cited by examiner

Primary Examiner—James W. Myhre
(74) Attorney, Agent, or Firm—Baker Botts L.L.P.

(57) ABSTRACT

A knowledge management system (10) includes clients (12) in communication with a server (14). The server (14) includes a knowledge matrix (18) that includes a knowledge worker grid (100), a process grid (110), a process cycle grid (130), a data grid (150), and a data cycle grid (170). The knowledge matrix (18) identifies process items (118, 120) and data items (156, 158) associated with a knowledge worker operating the client (12). The server (14) accesses status information (134, 138, 174, 178, 180) stored in the knowledge matrix (18) relating to the identified process items (118, 120) and data items (156, 158).

12 Claims, 7 Drawing Sheets

FIG. 6

ACCOUNT MANAGER (310, 312, 314)

| THINGS TO KNOW ABOUT | THINGS TO KNOW HOW TO DO |
|---|---|
| • CUSTOMER 1 | • PREPARE A PROPOSAL |
| • CUSTOMER 2 | • STRATEGIC PLANNING |
| • PROJECT 1 | • BILLING |
| • PROJECT 2 | • ESTABLISH ACCOUNT |
| • FINANCIAL RESOURCES | • MAINTAIN ACCOUNT |
| • CURRENT EVENTS | • HIRE EMPLOYEE |
| • COMPANY NEWS | • ORDER SOFTWARE |
| • FREQUENTLY ASKED QUESTIONS | • TRAVEL REIMBURSEMENT |
| ⋮ | ⋮ |

FIG. 7

| STRATEGIC PLANNING | INPUTS | STEP DETAIL | DELIVERABLES | TIPS | TOOLS | TECHNIQUES |
|---|---|---|---|---|---|---|
| IDENTIFY THE ORGANIZATION'S VISION, VALUE SYSTEM, AND STRATEGIC THRUST | 📄 336 | 📄 | 📄 | 📄 | 📄 | 📄 |
| IDENTIFY STAKEHOLDERS | 📄 | 📄 338 | 📄 | 📄 | 📄 | |
| INDENTIFY AND TABULATE THE BUSINESS OBJECTIVES, CRITICAL SUCCESS FACTORS, STRATEGIES, AND GOALS | 📄 | 📄 | 📄 | 📄 | 📄 | |
| IDENTIFY PERFOMANCE MEASURES | 📄 | 📄 | 📄 340 | 📄 | 📄 | |
| VALIDATE UNDERSTANDING OF THE BUSINESS DRIVERS AND OPPORTUNITIES | 📄 | | 📄 | | | |

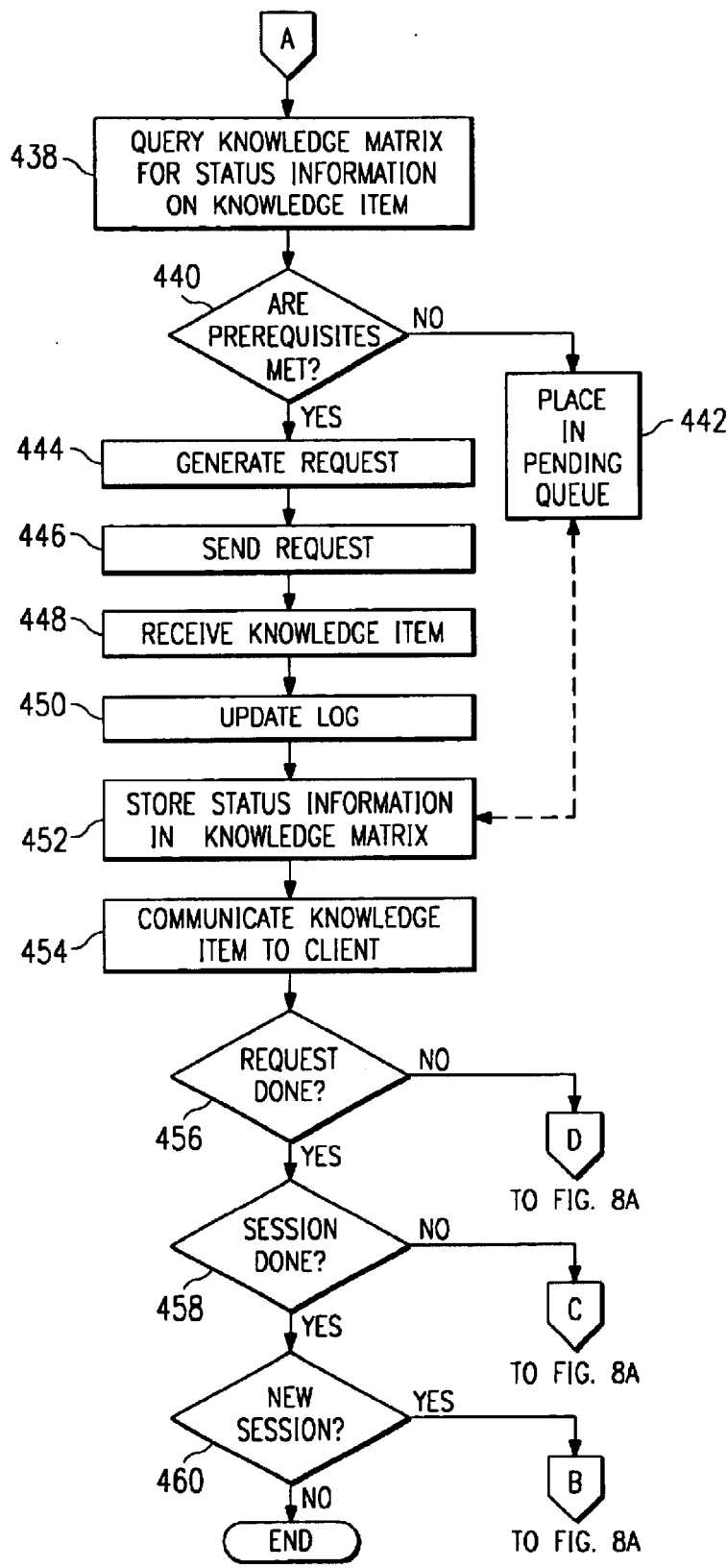

KNOWLEDGE MANAGEMENT SYSTEM AND METHOD

TECHNICAL FIELD OF THE INVENTION

This invention relates in general to the field of computing systems, and more particularly to a knowledge management system and method.

BACKGROUND OF THE INVENTION

Many people use information or knowledge as part of their function within a business or other organization. These knowledge workers acquire information from multiple sources, and use this information in relation to some business activity to generate value to the corporation or entity. As available information sources become larger and more complex to serve a variety of knowledge workers, the task to identify and retrieve significant and meaningful information becomes more difficult. This flood of information presents a challenge to provide information to the user that is valid and useful in the knowledge worker's activities.

Knowledge workers may spend significant time looking for the applicable information to achieve their business purpose. Once locating the appropriate information, the knowledge workers spend additional time validating and reformatting the information to meet the current need. Worker productivity may be improved by quickly locating the item the worker needs, providing the item when it is needed, and assuring that the item is the correct instance to satisfy the need.

Existing systems that collect, manage, and categorize information may not ensure the validity and usefulness of information for the knowledge worker. Often these systems fail to recognize the association between the knowledge worker and particular information. Also, these existing systems do not effectively manage and identify variations in the information over time.

SUMMARY OF THE INVENTION

According to the present invention, the disadvantages and problems associated with managing information have been substantially reduced or eliminated.

According to one embodiment of the present invention, a computer-based knowledge management system includes a client that generates a first request. The client is associated with a knowledge worker. A server coupled to the client receives the first request. The server includes a knowledge matrix that stores status information on a number of knowledge items associated with the first request. The server generates a second request in response to the status information stored in the knowledge matrix. An information source, in response to the second request, communicates information to the server to satisfy the first request.

Important technical advantages of the present invention include a knowledge management system and method that maintains a relationship between knowledge items in a knowledge matrix. The knowledge items may include dynamic or static process items or data items. The knowledge matrix associates knowledge workers to predefined needs, where each need identifies one or more knowledge items to satisfy the knowledge worker's request. The knowledge matrix also stores status information on the identified knowledge items to determine whether the identified knowledge items are current, in existence, available, or otherwise in the proper form or status to satisfy the knowledge worker's request. In this manner, the knowledge matrix defines a knowledge worker's need by one or more interrelated and dependent process or data items.

Further technical advantages of the present invention include the establishment of knowledge worker profiles using both default profiles and personal profiles. A watch module monitors a knowledge worker's activities over time to further refine and customize the personal profile. Also, a pending module notifies a knowledge worker of the change in status information of a requested knowledge item. Moreover, knowledge management system provides an interface module that accesses a variety of existing information sources to provide appropriate and useful knowledge items to the knowledge workers.

In a particular embodiment, the knowledge management system is implemented in a client/server environment where clients access knowledge items through communication sessions with the server. In a more particular embodiment, the knowledge management system is at least partially implemented using hypertext mark-up language (HTML) information having associated uniform resource locator (URL) addresses. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 6 illustrates an exemplary display showing knowledge items associated with a knowledge worker;

FIG. 7 illustrates an exemplary display showing in more detail a knowledge item for the knowledge worker; and FIGS. 8A and 8B are a flow chart of a method of operation of the knowledge management system.

DETAILED DESCRIPTION OF THE INVENTION

Figure 1:
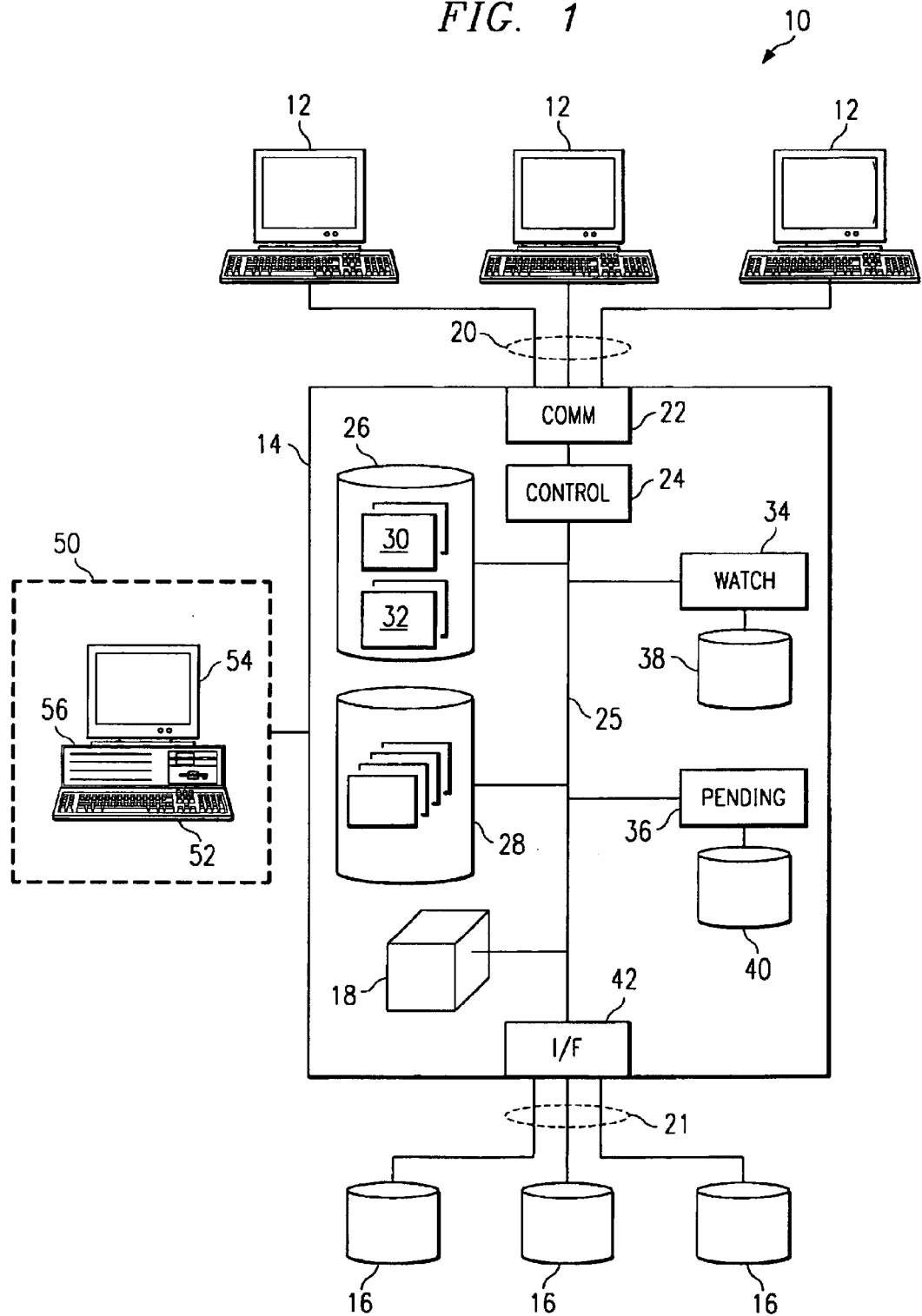
FIG. 1 illustrates a knowledge management system according to the present invention.

FIG. 1 illustrates a knowledge management system 10 that includes a number of clients 12, a server 14, and information sources 16. Server 14 maintains a knowledge matrix 18 that provides a multi-dimensional mapping of the information requirements, sources, perspective, and currency for knowledge workers operating clients 12. Specifically, knowledge matrix 18 maintains status information on a variety of dynamic and static process items and data items accessible by server 14. In general, server 14 using knowledge matrix 18 accesses information stored internally or in information sources 16 to deliver the right information at the right time to knowledge workers operating clients 12 in system 10.

Clients 12 access server 14 using hardware and software associated with link 20. Server 14 accesses information sources 16 using hardware and software associated with link 21. Information sources 16 may include executive information systems, decision support systems, data warehouses, production systems or other sources of information. Information sources 16 may reside internal or external to server 14. Moreover, information sources 16 may be accessed from within an intra-network or virtual private network (VPN) associated with a business entity or through a firewall or gateway to public sources, such as the Internet.

Links 20 and 21 may be a dedicated or switched link over the public switch telephone network (PSTN), a satellite link, a microwave link, or other appropriate communication link between client 12 and server 14. The components of system 10 may be part of a local area network (LAN), wide area network (WAN), or any other suitable network of interconnected computing devices. In a particular embodiment, components in system 10 communicate over the Internet or other suitable computer network using the World Wide Web (WWW), file transfer protocol (FTP), Telnet, Usenet, Gopher or Archie utility, electronic mail, bulletin boards, or other communication technique. For example, clients 12 and server 14 may maintain and execute a browser or other suitable program for accessing and communicating information addressed by a uniform resource locator (URL) address using links 20 and 21. Links 20 and 21 may also include OFFICE VISION MAIL, LOTUS NOTES, MICROSOFT MAIL, an interactive web page, or any other suitable communication application or tool. Moreover, components of system 10 may form an intra-network or virtual private network (VPN) associated with a particular business entity.

Although clients 12 and server 14 are referred to in the nomenclature of a client/server environment, it should be understood that clients 12 and server 14 may be any type of computer operating in any suitable environment that communicates information using communication link 20. For example, the components in system 10 may be arranged in a peer-to-peer computing environment.

In addition to the communication hardware and software described above, components in system 10 include memory devices, such as databases, that store information. Throughout this description, components in system 10 store, communicate, and access information using any format, structure, or arrangement including without limitation machine-readable or user-readable text and graphics. In a particular embodiment, information exchanged in system 10 includes documents or files written in hypertext mark-up language (HTML), HTML Plus, standard generalized mark-up language (SGML), virtual reality mark-up language (VRML), or any other appropriate content development language. Information in system 10 may also include program code, such as applets written in JAVA developed by SUN MICROSYSTEMS, or other appropriate self-executing code.

Server 14 includes a communication module 22 coupled to communication link 20 that supports communication between clients 12 and the various components of server 14. A control module 24 is coupled to communications module 22 and directs the overall operation and function of server 14. For example, control module 24 comprises a collection of programs running on a processor that coordinate, manage, and integrate the various components and functions of server 14. Control module 24 is coupled to a virtual or physical bus 25 that allows communication among the various components of server 14.

Bus 25 is coupled to knowledge matrix 18, database 26, and database 28. Knowledge matrix 18, described in more detail with reference to FIG. 2, organizes knowledge items and maintains status information that specifies the requirements, sources, perspectives, and currency of the knowledge items. Database 26 maintains knowledge worker profiles, such as personal profiles 30 and default profiles 32, which are described in more detail below with reference to FIGS. 3 and 4. Database 28 maintains content development language, program code, and other information to display, present, or otherwise convey information to clients 12. Exemplary displays generated by information maintained in database 28 are described in more detail below with respect to FIGS. 5–7.

Database 28 and information sources 16 store knowledge items, such as process items or data items, accessible by a knowledge worker associated with client 12. Knowledge matrix 18 provides a mapping or association between the knowledge worker requests and associated knowledge items. Knowledge matrix 18 may also include the content of knowledge items themselves or pointers or other references to knowledge items stored in database 28 and information sources 16.

Also coupled to bus 25 is watch module 34 and pending module 36. Watch module 34 is coupled to log 38, which stores information on the activities of knowledge workers using system 10. For example, watch module 34 and log 38 gather times, uniform resource locator (URL) addresses, knowledge worker inputs, and other information to construct an historic footprint of the knowledge worker in system 10. Pending module 36 is coupled to pending queue 40, which stores uncompleted requests for information generated by clients 12. For example, pending module 36 and pending queue 40 gather times, content of the request, identifiers for uncompleted, non-existent, or unavailable knowledge items, status information or other information to construct a record of unfulfilled requests for information. As described below, pending module 36 continues to monitor the operation of server 14, and status information stored in knowledge matrix 18 in particular, to determine when the uncompleted requests for information are fulfilled. Watch module 34 and pending module 36 may be implemented as demons, robots, self-executing code, personal intelligent agents, or other processes that are either integral to or separate from the operation of control module 24. Also coupled to bus 25 is interface module 42 that supports communication between information sources 16 and components of server 14.

Clients 12 and server 14 may operate on one or more computers, such as computer 50 associated with server 14. Each computer 50 includes an input device 52 such as a keypad, touch screen, mouse, microphone, or other device that can accept information. Output device 54 conveys information associated with the operation of system 10, including digital or analog data, visual information, or audio information. Both input device 52 and output device 54 may include fixed or removable storage media, such as a magnetic computer disk, CD-ROM, or other suitable media to both receive output from and provide input to system 10. Computer 50 may have a processor 56 and an associated volatile or non-volatile memory to execute instructions and manipulate information in accordance with the operation of system 10.

Computer 50 associated with server 14 maintains and executes the instructions to implement communication module 22, control module 24, watch module 34, pending module 36, and interface module 42. Each module in server 14 comprises any suitable combination of hardware and software in computer 50 to implement the function or operation of the module. For example, modules may include program instructions and associated memory and processing components to execute the program instructions. Also, modules illustrated in FIG. 1 may be separate from or integral to other modules.

Knowledge matrix 18, database 26, database 28, log 38, and pending queue 40 on server 14 may comprise one or more files, lists, or other arrangement of information stored in one or more components of random access memory (RAM), read only memory (ROM), magnetic computer disk, CD-ROM, other magnetic or optical storage media, or any other volatile or non-volatile memory. Similarly, information sources 16 may also comprise any of the storage arrangements listed above with reference to server 14. Also, although FIG. 1 illustrates several databases as internal to server 14, it should be understood that databases represent any suitable memory internal or external to components of system 10, depending upon the particular implementation. Moreover, databases illustrated in FIG. 1 may be separate from or integral to other databases.

In operation, client 12 operated by or associated with a knowledge worker, initiates a session with server 14 using link 20. Upon initiation of the session, control module 24 accesses a knowledge worker profile stored in database 26, such as personal profile 30 or default profile 32, to establish parameters for the session. Server 14 then presents a menu or display containing a selection of items of interest to the knowledge worker. In response to a selection specifying a request or need for information, control module 24 accesses information maintained in database 28 and information sources 16 to provide a graphical interactivity with the information stored, maintained, or accessible by server 14. During this interaction with client 12, server 14 consults knowledge matrix 18 to provide the appropriate knowledge items for the knowledge worker associated with client 12. As described in more detail below with reference to FIG. 2, knowledge matrix 18 provides a multi-dimensional mapping of the information requirements, sources, perspective, and currency that are of interest to knowledge workers in system 10. If appropriate, the session between client 12 and server 14 may cause interface module 42 to access information sources 16 using link 21 to provide the requested information to client 12.

During the session, watch module 34 compiles information for storage in log 38 that recounts the activities and interaction of client 12 with server 14. During or after the session, watch module 34 may access information stored in log 38 to generate access statistics, such as times, URLs, knowledge worker inputs, activity sequences, and other information to develop an historical footprint of the knowledge worker's activities in system 10. Watch module 34 actively monitors the session and may modify personal profiles 30 in response to the historical footprint of the knowledge worker. For example, if watch module 34 consults log 38 and determines that a particular knowledge worker has repeatedly accessed a particular knowledge item, URL, or other information, then watch module 34 may modify personal profile 30 to customize the individual view or menus presented at the beginning of a session. In this manner, watch module 34 periodically modifies personal profile 30 to provide a knowledge worker menu or presentation that includes options that are frequently performed and excludes options that are infrequently or never performed.

In a particular embodiment, watch module 34 initializes a knowledge worker's personal profile 30 with parameters maintained in an associated default profile 32, depending on the current knowledge worker view. For example, watch module 34 may initially consult an account manager default profile 32 when knowledge worker first accesses system 10 using the account manager knowledge worker view. In later sessions, watch module 34 continues to adjust personal profile 30 based on the knowledge worker's use of system 10 as an account manager. Moreover, watch module 34 may monitor a knowledge worker session and actively anticipate the next series of actions based on case-based reasoning, fuzzy logic, an appropriate expert system, or any suitable adaptive or learning technique to further enhance the customization and productivity of a knowledge worker in system 10.

Also during the session between client 12 and server 14, pending module 36 identifies particular knowledge items requested by client 12 that are too early or too late in their life cycle, not available, not completed, not in existence, or otherwise not in the proper form or status. Upon detecting such a knowledge item, pending module 36 generates an entry in pending queue 40 to represent the unfulfilled request. Continuously or periodically, pending module 36 compares status information maintained in knowledge matrix 18 with entries in pending queue 40 to determine if requested knowledge items are now ready for communication to client 12. Upon pending module 36 detecting status information that indicates the availability of a requested knowledge item, server 14 provides client 12 with either the knowledge item itself or a notification that the knowledge item is available. This is an important technical advantage of the present invention, since many of the knowledge items requested by clients 12 are time variant, and their usefulness to a knowledge worker may depend on the proper instantiation of the knowledge item in time.

An example illustrates the technical advantage of pending module 36. A first knowledge worker requests a process item to generate a bid proposal, and has currently produced an outline of the proposal in accordance with the pre-defined steps of the "bid proposal" process item. A second knowledge worker having the task of approving the bid proposal, communicates a need or request to server 14 for a copy of the final draft of the bid proposal. In response to the request, control module 24 accesses status information stored in knowledge matrix 18, which indicates that the final draft of the bid proposal is not yet available. In a particular embodiment, the entry in knowledge matrix 18 that corresponds to the requested instance (final draft) of the requested data item (bid proposal) is empty. Similarly, the entry in knowledge matrix 18 corresponding to the step (generation of final draft) of the pending process item (generate bid proposal) is also empty. Therefore, control module 24 can query knowledge matrix 18 to determine if the step of a pending process item or instance of a requested data item is available, complete, or in existence.

If the final draft is unavailable, pending module 36 generates an entry for storage in pending queue 40 that reflects the second knowledge worker's request for the final draft of the bid proposal. The first knowledge worker then submits the final draft to server 14. In response, control module 24 updates status information by populating entries in knowledge matrix 18 to indicate the availability of the final draft. Pending module 36 detects the existence of the final draft, and notifies the second knowledge worker of its availability.

Figure 2:
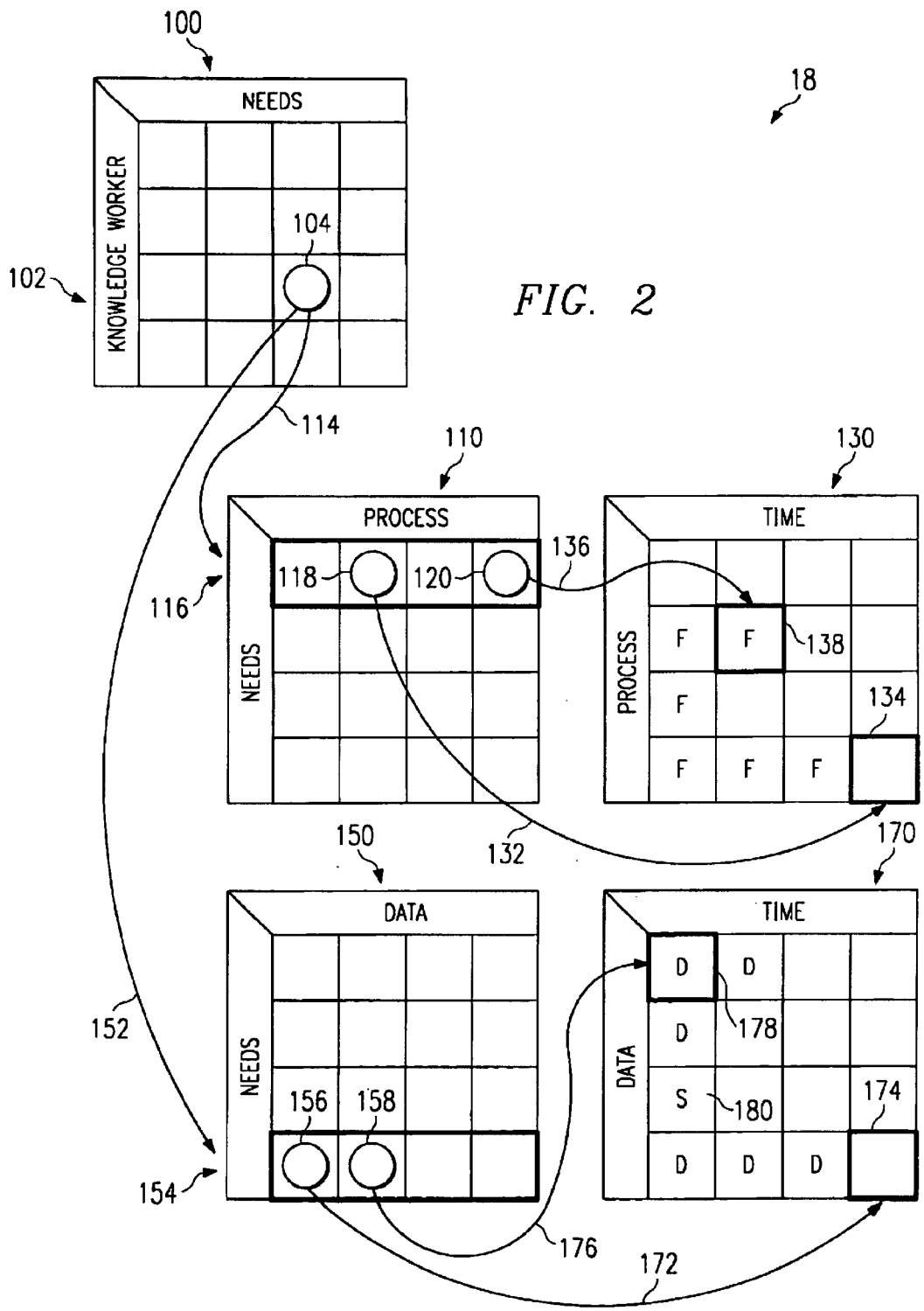
FIG. 2 illustrates an example knowledge matrix used in the knowledge management system.

FIG. 2 illustrates the structure and content of knowledge matrix 18. The multi-dimensional mapping performed by knowledge matrix 18 is represented in FIG. 2 as a cascaded set of two-dimensional grids. Knowledge matrix 18 includes a knowledge worker grid 100, process grid 110, process cycle grid 130, data grid 150, and data cycle grid 170. By maintaining, modifying, and updating the interrelationships and contents of these grids, knowledge matrix 18 establishes a relationship between knowledge workers, their needs, and the knowledge items that support those needs. In addition, knowledge matrix 18 stores status information on knowledge items supported by system 10 in the form of flags, pointers, or other references.

Knowledge worker grid 100 includes a row for each knowledge worker in system 10 and a column for each need satisfied by the operation of system 10. In a particular embodiment, knowledge worker grid 100 maintains a row or entry for each knowledge worker view of each knowledge worker accessing system 10. Process grid 110 includes a row for each need identified in knowledge worker grid 100 and a column for each process item that supports those needs. A process item in process grid 110 represents an available process item, pending process items, and other instantiations of process items currently supported by system 10. Similarly, data grid 150 includes a row for each need identified in knowledge worker grid 100 and a column for each data item that supports those needs. Generally, the combination of knowledge worker grid 100, process grid 110, and data grid 150 establishes a temporal association and dependency between knowledge workers, their needs, and the associated process items and data items to fulfill those needs.

Process cycle grid 130 includes a row for each process item identified in process grid 110 and a column for each defined step of the process item. For example, each process item may include numerous steps or milestones that define the progress and level of completion of the process item. The total number of steps for different process items may vary, therefore, each process item represented in process cycle grid 130 may have a number of steps equal to or less than the number of columns of process cycle grid 130.

Data cycle grid 170 includes a row for each data item identified in data grid 150 and a column for each instance or occurrence of the data item. For example, each data item may include numerous instances that define the life cycle of the data item as it is created, modified, and deleted. The total number of instances for different data items may vary, therefore, each data item represented in data cycle grid 170 may have a number of instances equal to or less than the number of columns of data cycle grid 170. During the operation of system 10, server 14 updates status information stored in process cycle grid 130 and data cycle grid 170 as steps in process items are executed and completed and instances of data items created. In a particular example, server 14 populates process cycle grid 130 with status information in the form of execution flags (F) to indicate the status of particular steps in process items. Similarly, server 14 populates entries in data cycle grid 170 with status information in the form of data identifiers (D, S) to represent instances of data items. Throughout this description, status information refers to the existence or absence of any suitable flag, pointer, or reference maintained by, referenced by, or stored in process cycle grid 130 and data cycle grid 170.

Now referring to an exemplary arrangement of knowledge matrix 18 shown in FIG. 2, a knowledge worker represented by row 102 may be associated with a particular request or need 104. Throughout this description, the term "need" represents one or more discrete requests communicated from client 12 to server 14 that involve access to one or more process or data items. For example, a knowledge worker acting as an account manager may have a need to access customer information, review financial information, consult company news, or access some other form of data item. Moreover, need 104 may represent activities performed by an account manager, such as preparing a proposal, performing strategic planning, establishing or maintaining accounts, hiring employees, or other activity. Each entry in knowledge worker grid 100 relates to a particular knowledge worker and an associated need, and identifies one or more process or data items in process grid 110 and data grid 150, respectively, to fulfill the need.

As a knowledge worker accesses and uses system 10, watch module 34 monitors the activity of the knowledge worker and adjusts knowledge worker grid 100 accordingly. For example, watch module 34 may determine that certain needs of a knowledge worker should be added, modified, or deleted to reflect the historical footprint of the knowledge worker in system 10. Each need in knowledge worker grid 100 may correspond to a menu item presented to the knowledge worker upon initiation of a session in system 10. Watch module 34 can modify knowledge worker grid 100, personal profile 30, default profile 32, or a combination of these components to provide a more productive and customized interaction between a knowledge worker and system 10.

Need 104 in knowledge worker grid 100 includes a pointer 114 that references row 116 in process grid 110, which includes two process items 118 and 120 to fulfill need 104. Each process item 118 and 120 relates to status information stored in process cycle grid 130. Specifically, each process item 118 and 120 includes a pointer or other reference that specifies a particular stage or step of process items 118 and 120. Process item 118 comprises a pointer 132 that refers to an entry 134 in process cycle grid 130 that represents the fourth step of process item 118. Entry 134 is illustrated as empty, indicating that the fourth step of process item 118 specified by need 104 has not yet completed. Process item 120 comprises a pointer 136 that refers to an entry 138 in process cycle grid 130 that represents the second step of process item 120. In this case, entry 138 includes status information in the form of a flag (F) that indicates the second step of process item 120 has completed execution. It should be understood that process cycle grid 130 may include any appropriate flags, pointers, or other information to indicate whether particular steps in process items are already executed, executing, or not yet executed.

Need 104 also includes a pointer 152 that references row 154 in data grid 150, which includes in this illustration two data items 156 and 158 to fulfill need 104. Each data item 156 and 158 relates to status information stored in data cycle grid 170. Specifically, each data item 156 and 158 includes a pointer or other reference that specifies a particular instance of data items 156 and 158 over their life cycle. Data item 156 comprises a pointer 172 that refers to an entry 174 in data cycle grid 170 that represents the fourth instance of data item 156. Entry 174 is illustrated as empty, indicating that the fourth instance of data item 156 specified by need 104 is not yet available. Data item 158 comprises a pointer 176 that refers to an entry 178 in data cycle grid 170 that represents the first instance of data item 158. Entry 178 includes status information in the form of a data identifier (D) that indicates that the first instance of data item 158 is available. Data cycle grid 170 may also include one or more entries 180 that contain a static data identifier (S) that indicates that the requested data item is not time sensitive and, therefore, would always be available in system 10. Identifiers S and D may include a pointer to the identified instance of the data item or the identified instance of the data item itself.

The hierarchical arrangement of knowledge matrix 18 may be implemented in any appropriate fashion using pointers, records, associated lists, or other suitable arrangement of information. In the particular embodiment, need 104, process items 118 and 120, and data items 156 and 158 all comprise pointers that refer to status information stored in process cycle grid 130 and data cycle grid 170. Status information in process cycle grid 130 includes a flag (F) that indicates the status of the identified step of the identified process item.

In response to requests or needs from clients 12, server 14 supports and executes steps in process items, receives input from clients 12 or information sources 16, and generates instances of data items. Control module 24 continually updates status information stored in knowledge matrix 18. For example, as a knowledge worker proceeds with execution of a process item, control module 24 populates an entry in process cycle grid 130 to indicate each completed step. Similarly, control module 24 populates data cycle grid 170 with instances of data items. The status information stored in knowledge matrix 18 provides a snapshot of the progression of process items and the generation of data items in system 10.

Moreover, knowledge matrix 18 provides a technical advantage by relating knowledge worker needs 104 with associated process items 118 and 120 and data items 156 and 158. These associations are implemented in a particular embodiment using pointers between knowledge worker grid 100, process grid 110, and data grid 150. As additional needs, process items, and data items are added to knowledge matrix 18, additional entries and pointers can be created to provide an interrelationship between knowledge workers, needs and the process items and data items that support those needs.

Figure 3:
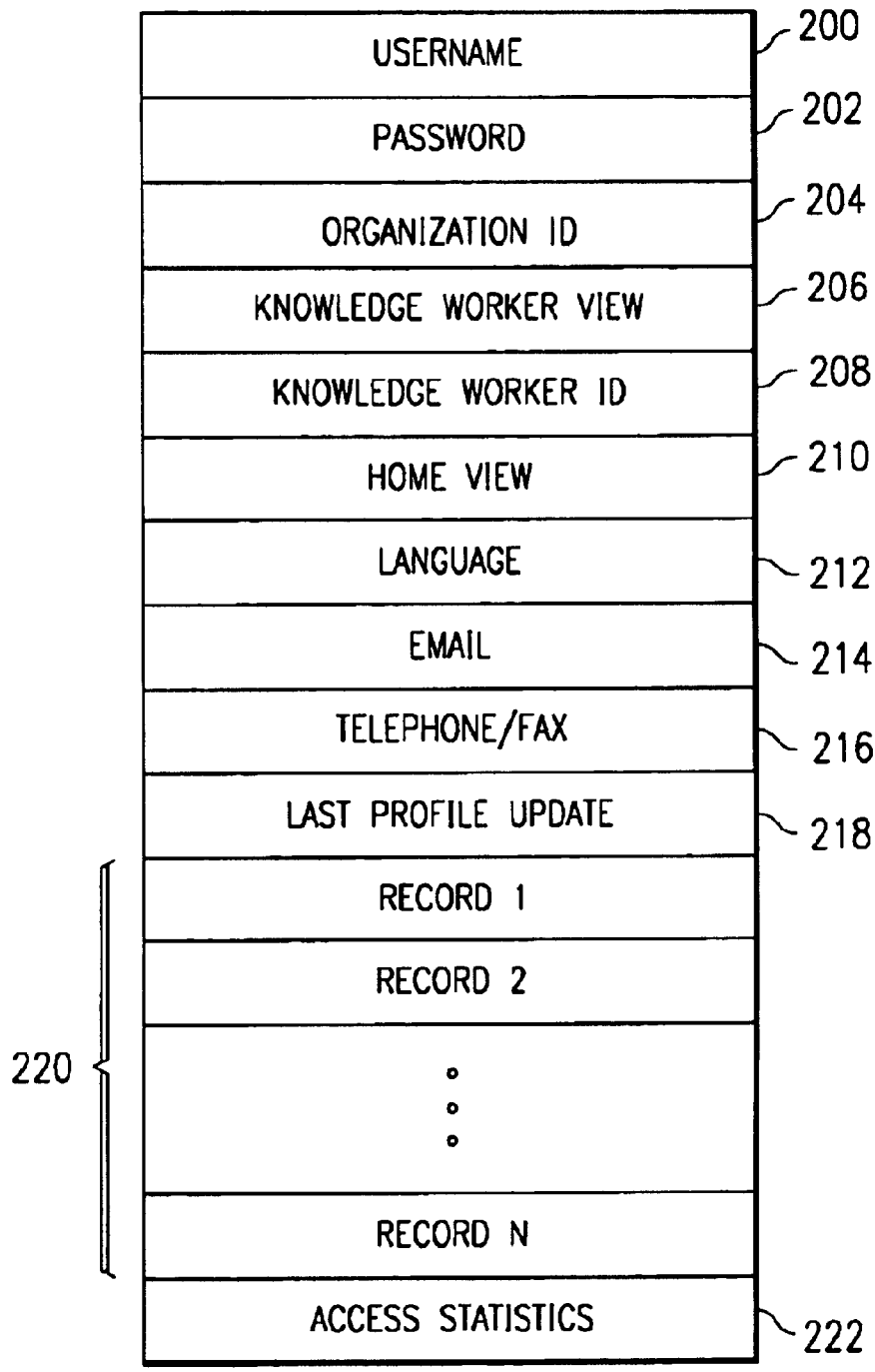
FIG. 3 illustrates an example knowledge worker profile.

FIG. 3 illustrates an example personal profile 30 maintained in database 26 of server 14. In a particular embodiment, server 14 generates personal profiles 30 for each knowledge worker view of each knowledge worker accessing system 10. Personal profile 30 preferably includes a username 200, an optional password 202, and an organization identifier (ID) 204. A knowledge worker view 206 may be chosen from a list of supported knowledge worker views, which may include for example and without limitation; account manager, business analyst, consultant, systems engineer, sales representative, web master, or other knowledge worker views supported by system 10. It should be understood that a single individual operating client 12 may access server 14 using a number of knowledge worker views 206. A knowledge worker identifier (ID) 208 uniquely identifies a combination of username 200 and knowledge worker view 206. Therefore, a single knowledge worker accessing system 10 may maintain several knowledge worker views 206, with each knowledge worker view 206 represented by a different knowledge worker ID 208.

Personal profile 30 also includes a home view 210 that specifies the URL or other information in database 28 or information sources 16 that begins the session. A language 212 can be set to accommodate a knowledge worker. Personal profile 30 may also maintain personal contact information, such as an electronic mail address 214 and a telephone and/or fax number 216.

Watch module 34 may use a last profile update 218 to determine whether or how often to update or modify personal profile 30. A number of records 220 are associated with knowledge worker ID 208 and represent current or expected activities of the knowledge worker. For example, one or more records 220 may represent a pending process item, an associated data item, a frequently visited process or data item, or other information that reflects or represents the knowledge worker's interaction with system 10. A particular embodiment of record 220 is illustrated with reference to FIG. 4.

Personal profile 30 also includes various access statistics 222 generated by watch module 34 using information stored in log 38. Access statistics 222 may include usage statistics, an identification of frequently visited sites, frequently accessed or relevant process and data items, or other information that allows server 14 to communicate relevant and meaningful information to the knowledge worker and to anticipate the knowledge worker's activity in system 10. Access statistics 222 may be derived by watch module 34 using case based reasoning, fuzzy logic, a suitable expert system, or other adaptive or learning technique.

Default profile 32 incorporates many of the same features as personal profile 30 illustrated in FIG. 3. Server 14 maintains a default profile 32 for each knowledge worker view 206 supported by system 10. Default profile 32 may include home view 210, language 212, and a number of records 220 representing a starting stereotype for the associated knowledge worker view 206. If appropriate, default profile 32 may also include last profile update 218, records 220, and associated access statistics 222. Server 14 generates personal profile 30 by copying baseline information from default profile 32 having the same knowledge worker view 206. In this manner system 10 can offer a variety of default profiles 32 for new knowledge workers, while allowing personal profiles 32 to be continuously adjusted and customized to the specific knowledge worker's needs and activities.

Figure 4:
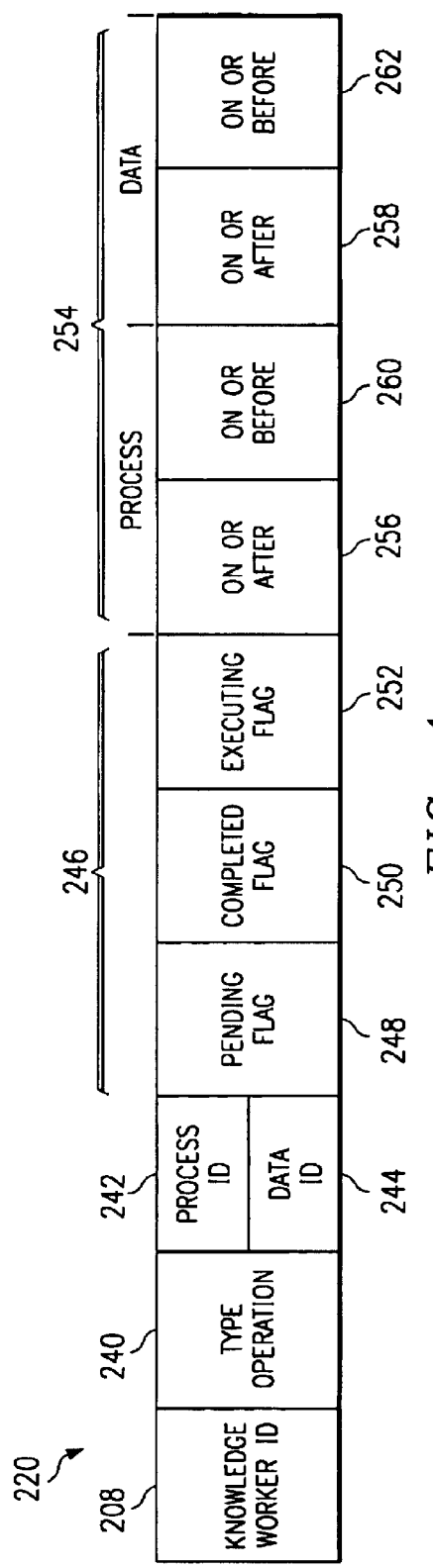
FIG. 4 illustrates an example record maintained by the knowledge worker profile.

FIG. 4 illustrates a particular embodiment of record 220 stored in personal profile 30 or default profile 32. Each record 220 includes knowledge worker ID 208 representing a combination of a particular username 200 and a particular knowledge worker view 206. Record 220 also includes a type operation 240 that designates whether record 220 represents a "get" or "post" activity of the knowledge worker. Knowledge worker ID 208 specifies a row of knowledge worker grid 100 in knowledge matrix 18.

Record 220 also includes a process identifier (ID) 242 that specifies a particular process item executed by the knowledge worker in system 10. Process ID 242 specifies a row in process cycle grid 130 of knowledge matrix 18. Similarly, record 220 may include a data identifier (ID) 244 that specifies a particular data item corresponding to a row in data cycle grid 170. In a particular embodiment, record 220 includes either a process ID 242 or a data ID 244. Record 220 includes a number of flags 246 that specify status information associated with process ID 242 or data ID 244. These flags may include without limitation a pending flag 248, a completed flag 250, and an executing flag 252.

Each record 220 may include timing metrics 254 that specify the period and time when knowledge worker desires to access process ID 242 or data ID 244. Process timing metrics include an "on or after" field 256 that may contain a pointer or reference to an entry in process cycle grid 130. Similarly, data timing metrics include an on or after field 258 that may contain a pointer or reference to an entry in data cycle grid 170. Both fields 256 and 258 point to occupied or completed entries in process cycle grid 130 and data cycle grid 170, respectively, before server 14 communicates the requested process or data item to the knowledge worker.

Similarly, process timing metrics also include an "on or before" field 260, which may contain a pointer or reference to an entry in process cycle grid 130. Data timing metrics also include an on or before field 262 which may contain a pointer or reference to an entry in data cycle grid 170. Both fields 260 and 262 point to uncompleted or empty entries in process cycle grid 130 and data cycle grid 170, respectively, before server 14 communicates the requested process or data item to the knowledge worker. Timing metrics 254 allow any record 220 to be placed in sequence with respect to process item steps and data item instances.

Figure 5:
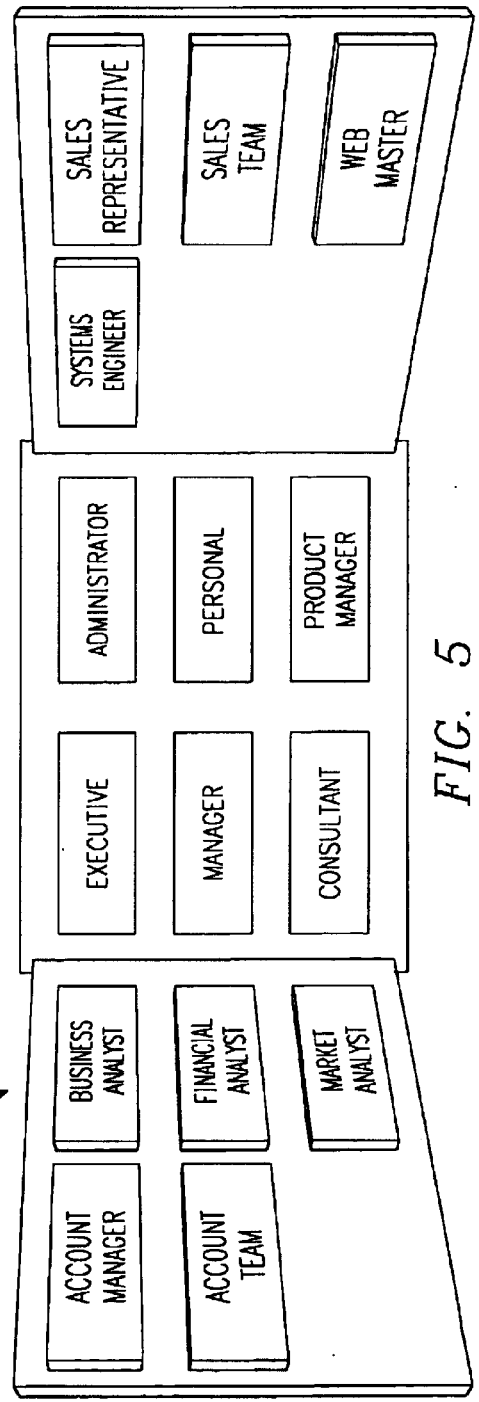
FIG. 5 illustrates an exemplary display depicting the different knowledge worker views supported by the knowledge management system.

FIG. 5 illustrates an exemplary screen display 300 presented to a knowledge worker upon initiation of a session with server 14. Display 300 allows a knowledge worker to select a particular knowledge worker view for conducting the session. It should be understood that a knowledge worker utilizing system 10 may maintain a number of different knowledge worker views. Each knowledge worker view corresponds to a separate personal profile 30 that customizes and anticipates a knowledge worker's activities during a specific session.

Upon selecting a worker view in display 300, server 14 presents an exemplary screen display 310 shown in FIG. 6 that lists, for a given knowledge worker view such as an account manager, the "things to know about" 312 and the "things to know how to do" 314. These lists 312 and 314 may be generated by consulting records 220 or access statistics 222 in personal profile 30, a row of information in knowledge worker grid 100 of knowledge matrix 18, or other suitable information. Generally, things to know about 312 includes a listing of data items, while things to know how to do 314 includes a listing of process items. As a knowledge worker accesses system 10 using this particular knowledge worker view, server 14 may adjust lists 312 and 314 to reflect the current activities of the knowledge worker.

Upon selecting a particular item in lists 312 and 314, server 14 presents an exemplary screen display 320 shown in FIG. 7 that illustrates in more detail a selected process or data item. In this particular example, display 320 illustrates detailed information on strategic planning, which includes a number of related process items 322. Each process item 322 includes inputs 324, step detail 326, and deliverables 328. Inputs 324 represent other process items, data items, and user input needed to complete each process item 322. Step detail 326 represents information on the specific steps, subprocesses, or other information that define the execution and operation of each process item 322. Deliverables 328 represent the results or work product of each executed or completed process item 322, and these deliverables 328 may then be made available as inputs 324 for other pending process items 322 related to strategic planning or other process items supported in system 10. Display 320 preferably includes tips 330, tools 332, and techniques 334 that provide information on the execution, assumptions, and use of each process item 322 selected by the knowledge worker.

Each entry in the grid of display 320 may include a document icon that represents the underlying contents of the grid location. For example, a knowledge worker can activate icon 336 to view inputs 324 for a particular process item 322 that identifies the organization's vision, value system, and strategic thrust. Upon activation of icon 336, server 14 presents a screen of inputs 324 that may include previously completed or calculated inputs, inputs that are awaiting processing, inputs already provided by the knowledge worker, and inputs that are awaiting input by the knowledge worker. In this manner, icon 336 allows a knowledge worker to quickly assess the status of both automated and manual entry of inputs 324 to execute process item 322.

Upon activation of icon 338, server 14 presents the knowledge worker with step detail 326 on a particular process item 322 to identify stake holders. This step detail 326 may specify different steps within this process item 322 as illustrated and tracked in process cycle grid 130 of knowledge matrix 18. Specifically, step detail 326 specifies particular steps, milestones, or other intermediate details that specify how this process item 322 generates deliverables 328 from inputs 324.

Upon activation of icon 340 by the knowledge worker, server 14 presents deliverables 328, if any, of a particular process item 322 to identify performance measures. However, in this example, icon 340 is not shaded which indicates that the underlying information is non-existent or incomplete. The two previous icons for inputs 324 and step detail 326 are also not shaded indicating that this process item 322 has not received inputs or completed assigned steps. System 10 contemplates any appropriate methodology to indicate in a dynamic and visual manner the underlying contents of process and data items represented by display 320.

Figure 8A:
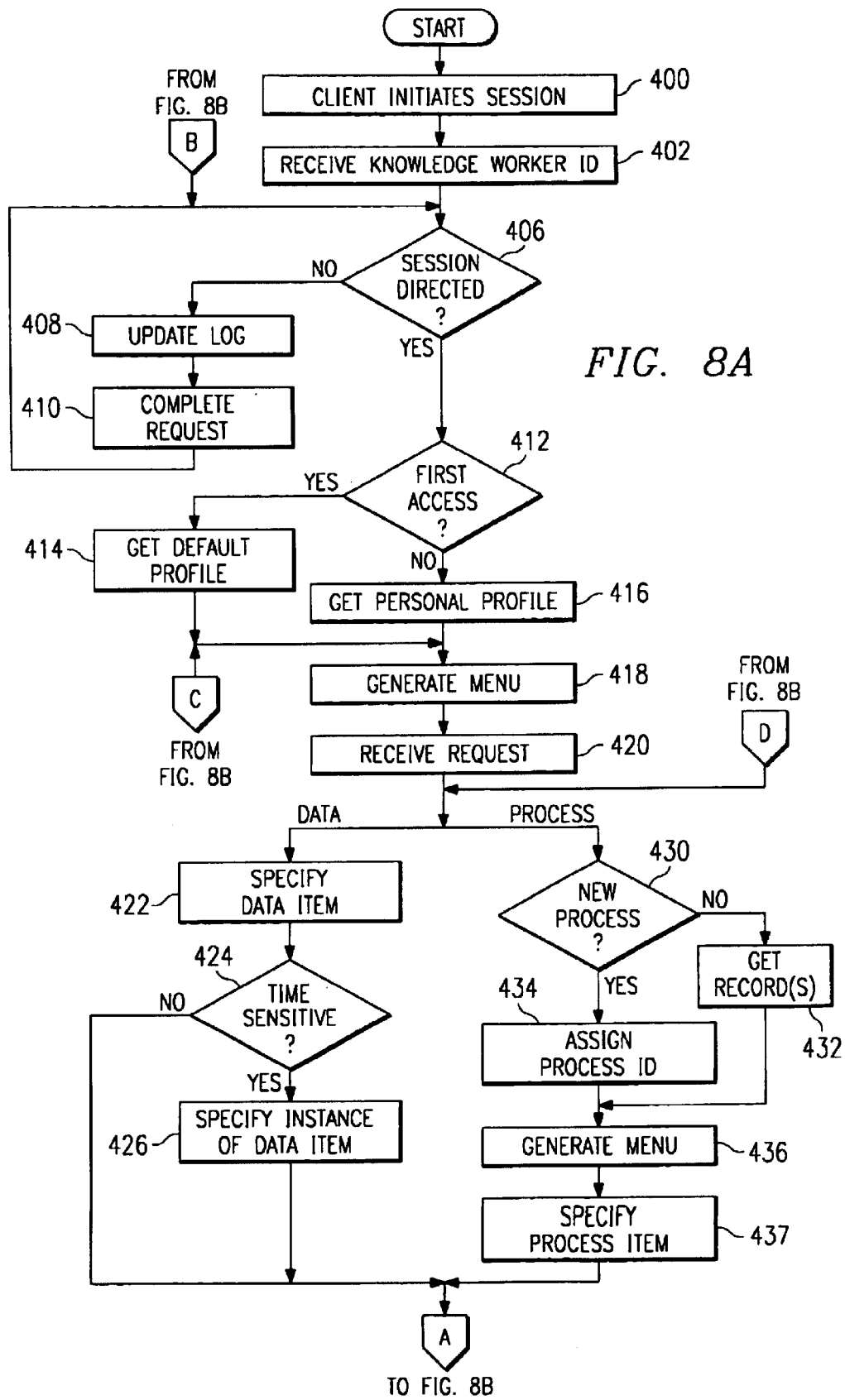

FIGS. 8A and 8B are a flow chart of a method of operation of system 10. The method begins at step 400 where client 12 operated by or associated with a knowledge worker initiates a session with server 14. Server 14 receives knowledge worker ID 208 at step 402 upon the knowledge worker specifying a username 200 and knowledge worker view 206. If the session is not directed at step 406, watch module 34 updates log 38 at step 408, server 14 completes the request at step 410, and the method loops back to determine whether the session is still directed at step 406.

The knowledge worker may trigger a directed session by selecting a knowledge worker view 206 associated with display 300 or similar display, or by otherwise specifying knowledge worker view 206. If the session is directed at step 406, server 14 determines if this is the first access for knowledge worker ID 208 at step 412. This may be determined by control mode 24 querying database 26 for personal profile 30 having the specified knowledge worker ID 208. If this is the first access for knowledge worker ID 208 as determined at step 412, control module 24 retrieves the appropriate default profile 32 from database 26 using the chosen knowledge worker view 206 at step 414. If this is not the first access at step 412, control module 24 retrieves personal profile 30 from database 26 using the specified knowledge worker ID 208 at step 416. Using either personal profile 30 obtained at step 416 or default profile 32 obtained at step 414, server 14 generates a menu or presentation at step 418, such as the menu represented by screen display 310 in FIG. 6.

The knowledge worker then selects an item on the menu generated at step 418, and server 12 receives a request or need associated with the menu selection at step 420. At this point, the method branches to specify data items and process items. It should be understood that a single request received by server 14 at step 420 may represent several process or data items that may be serially or simultaneously processed by server 14.

If the request relates to a data item, server 14 specifies the data item at step 422. This may be accomplished by control module 24 accessing a pointer or reference to the data item stored in knowledge worker grid 100 or data grid 150 in knowledge matrix 18. If the data item is time sensitive as determined at step 424, server 14 may specify an instance of the data item at step 426.

If the request at step 420 relates to a process item, server 14 determines if this is a new process at step 430. If the request reflects an existing process, control module 24 uses a specified existing process ID 242 to access existing records 220 stored in personal profile 30 that relate to process ID 242 at step 432. If the request reflects a new process item at step 430, control module 24 assigns a unique process ID 242 at step 434. If appropriate, server 14 generates a menu at step 436 such as screen 320 that specifies detailed information on one or more process items. In response to knowledge worker input, such as a menu selection, server 14 specifies a process item at step 437. This may be accomplished by control module 24 accessing a pointer or reference to the process item stored in knowledge worker grid 100 or process grid 110 in knowledge matrix 18.

Control module 24 next queries process cycle grid 130 or data cycle grid 170 of knowledge matrix 18 at step 438 to retrieve status information on the selected knowledge item. Next, server 14 determines if all prerequisites are met to communicate the selected knowledge item to the knowledge worker at step 440. If the knowledge item is a static data item, indicated by an "S" in data cycle grid 170, then by default all prerequisites are met. If the knowledge item is a dynamic or time sensitive data item and the data item is available, as indicated by a "D" in a corresponding entry in data cycle grid 170, then prerequisites are met at step 440. Similarly, prerequisites are met if the knowledge item is a process item, and the process item points to an entry in process cycle grid 130 that contains a flag (F) indicating completion of the step of the process item. If prerequisites are not met at step 440, then pending module 36 places the request for the uncompleted knowledge item in pending queue 40 at step 442. Pending module 36 may also store status information, knowledge item identifiers, knowledge worker identifiers, or other appropriate information in pending queue 40 at step 442.

If prerequisites have been met at step 440, then control module 24 generates a request for the specified and available knowledge item at step 444. Server 14 may service the request internally or send the request to external information sources 16 at step 446. Upon receiving the knowledge item in response to the request at step 448, watch module 34 updates log 38 at step 450 and, if appropriate, control module 24 stores updated status information in process cycle grid 130 and data cycle grid 170 in knowledge matrix 18 at step 452. Server 14 communicates the knowledge item to client 12 using communications module 22 and link 20 at step 454.

If the processing of the request received at step 420 is not done at step 456, server 14 proceeds to specify the next process or data item at steps 422 through 454. If the request is done at step 456 but the session is not done at step 458, server 14 generates an appropriate menu at step 418 and receives the next request from client 12 at step 420. If the session is done at step 458 and client 12 desires a new session at step 460, the method returns to determine whether the new session is directed at step 406. If client 12 does not desire a new session at step 460, the method ends.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A computer-based knowledge management system, comprising:
   a client operable to generate a first request, the client associated with a knowledge worker;
   a server coupled to the client and operable to receive the first request, the server comprising a knowledge matrix operable to store status information on a plurality of knowledge items associated with the first request, the server operable to generate a second request for the knowledge items if the status information stored in the knowledge matrix indicates the availability of the knowledge items; and
   an information source operable, in response to the second request, to communicate information to the server to satisfy the first request;
   wherein the knowledge matrix comprises:
      a knowledge worker grid operable to identify a plurality of needs associated with the knowledge worker, the knowledge worker grid operable to relate the first request to a selected need;
      a process grid operable to identify a process item associated with the selected need; and
      a data grid operable to identify a data item associated with the selected need.

2. The system of claim 1, further comprising:
   a watch module operable to generate access statistics in response to a knowledge management session between the client and the server, the watch module further operable to modify a personal profile of the knowledge worker in response to the access statistics.

3. A computer-based knowledge management system, comprising:
   a client operable to generate a first request, the client associated with a knowledge worker;
   a server coupled to the client and operable to receive the first request, the server comprising a knowledge matrix operable to store status information on a plurality of knowledge items associated with the first request, the server operable to generate a second request for the knowledge items if the status information stored in the knowledge matrix indicates the availability of the knowledge items; and
   an information source operable, in response to the second request, to communicate information to the server to satisfy the first request;
   wherein the knowledge matrix comprises:
      a knowledge worker grid operable to identify a plurality of needs associated with the knowledge worker, the knowledge worker grid operable to relate the first request to a selected need;
      a process grid operable to identify a process item associated with the selected need;
      a data grid operable to identify a data item associated with the selected need;
      a process cycle grid operable to store status information on a step of the identified process item; and
      a data cycle grid operable to store status information on an instance of the identified data item.

4. The system of claim 3, further comprising:
   a watch module operable to generate access statistics in response to a knowledge management session between the client and the server, the watch module further operable to modify a personal profile of the knowledge worker in response to the access statistics.

5. An apparatus for serving a knowledge worker, comprising:
   a memory operable to store status information on a plurality of knowledge items associated with a first request; and
   a processor control module coupled to the memory and operable to receive the first request from a client associated with the knowledge worker, the processor control module further operable to generate a second request for the knowledge items if the status information stored in the memory indicates the availability of the knowledge items, the processor control module further operable to receive information in response to the second request;

wherein the memory comprises:
- a knowledge worker grid operable to identify a plurality of needs associated with the knowledge worker, the knowledge worker grid operable to relate the first request to a selected need;
- a process grid operable to identify a process item associated with the selected need; and
- a data grid operable to identify a data item associated with the selected need.

6. The apparatus of claim 5, further compromising:
a processor watch module coupled to the processor control module, the processor watch module operable to generate access statistics in response to a knowledge management session between the knowledge worker and the apparatus, the watch module further operable to modify a personal profile of the knowledge worker in response to the access statistics.

7. An apparatus for serving a knowledge worker, comprising:
a memory operable to store status information on a plurality of knowledge items associated with a first request; and
a processor control module coupled to the memory and operable to receive the first request from a client associated with the knowledge worker, the processor control module further operable to generate a second request for the knowledge items if the status information stored in the memory indicates the availability of the knowledge items, the processor control module further operable to receive information in response to the second request;

wherein the memory comprises:
- a knowledge worker grid operable to identify a plurality of needs associated with the knowledge worker, the knowledge worker grid operable to relate the first request to a selected need;
- a process grid operable to identify a process item associated with the selected need;
- a data grid operable to identify a data item associated with the selected need;
- a process cycle grid operable to store status information on a step of the identified process item; and
- a data cycle grid operable to store status information on an instance of the identified data item.

8. The apparatus of claim 7, further compromising:
a processor watch module coupled to the processor control module, the processor watch module operable to generate access statistics in response to a knowledge management session between the knowledge worker and the apparatus, the watch module further operable to modify a personal profile of the knowledge worker in response to the access statistics.

9. A method for serving a knowledge worker, comprising:
receiving a first computerized request from a client associated with the knowledge worker;
retrieving, from a knowledge matrix stored in memory, status information on a knowledge item associated with the first request;
generating a second computerized request for the knowledge item if the status information received from the knowledge matrix indicates the availability of the knowledge item; and
receiving information related to the knowledge item in response to the second request;
wherein retrieving comprises:
relating the first request to a selected one of a plurality of needs associated with the knowledge worker;
retrieving a process item associated with the selected need; and
retrieving a data item associated with the selected need.

10. The method of claim 9, further compromising:
generating access statistics associated with the knowledge worker in response to a knowledge management session conducted by the client; and
modifying a personal profile of the knowledge worker in response to the access statistics.

11. A method for serving a knowledge worker, comprising:
receiving a first computerized request from a client associated with the knowledge worker;
retrieving, from a knowledge matrix stored in memory, status information on a knowledge item associated with the first request;
generating a second computerized request for the knowledge item if the status information received from the knowledge matrix indicates the availability of the knowledge item; and
receiving information related to the knowledge item in response to the second request;
wherein retrieving comprises:
relating the first request to a selected one of a plurality of needs associated with the knowledge worker;
retrieving a process item associated with the selected need;
retrieving a data item associated with the selected need;
retrieving status information on a step of the identified process item; and
retrieving status information on an instance of the identified data item.

12. The method of claim 11, further compromising:
generating access statistics associated with the knowledge worker in response to a knowledge management session conducted by the client; and
modifying a personal profile of the knowledge worker in response to the access statistics.

* * * * *